(12) United States Patent
Zeleniak et al.

(10) Patent No.: US 11,789,748 B2
(45) Date of Patent: Oct. 17, 2023

(54) FIRMWARE PARAMETERS OPTIMIZING SYSTEMS AND METHODS

(71) Applicant: SK hynix Inc., Gyeonggi-do (KR)

(72) Inventors: Dmitri Zeleniak, Minsk (BY); Uladzimir Marchanka, Minsk (BY); Uladzimir Hrek, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 416 days.

(21) Appl. No.: 17/063,349

(22) Filed: Oct. 5, 2020

(65) Prior Publication Data
US 2022/0107818 A1    Apr. 7, 2022

(51) Int. Cl.
*G06F 9/445* (2018.01)
(52) U.S. Cl.
CPC .............. *G06F 9/44505* (2013.01)
(58) Field of Classification Search
CPC ................................. G06F 9/44505
See application file for complete search history.

(56) References Cited

U.S. PATENT DOCUMENTS

| 10,282,185 | B2 | 5/2019 | Leonelli et al. | |
|---|---|---|---|---|
| 10,353,765 | B2 | 7/2019 | Edrich | |
| 2014/0082165 | A1* | 3/2014 | Marr | G06F 9/5044 709/222 |
| 2016/0313946 | A1 | 10/2016 | Zang et al. | |
| 2019/0108091 | A1 | 4/2019 | Chen | |
| 2019/0303043 | A1 | 10/2019 | Charnevich et al. | |

OTHER PUBLICATIONS

Latin square, https://en.wikipedia.org/wiki/Latin_square.

* cited by examiner

*Primary Examiner* — Gustavo Polo
(74) *Attorney, Agent, or Firm* — IP & T GROUP LLP

(57) ABSTRACT

A controller of a memory system optimizes parameters of firmware (FW). The controller receives, from a host, a set workload among multiple workloads, each workload including a corresponding restriction on performance metrics. The controller searches for a suboptimal parameter set satisfying restrictions for all workloads among multiple parameter sets for the firmware, based on the set workload, each parameter set including a plurality of parameters, each parameter associated with one or more performance metrics of the memory system.

18 Claims, 10 Drawing Sheets

FIG. 9A

| # | P1 | P2 | 1 | 2 | 3 | 4 | J | F {01} | F1 | |
|---|---|---|---|---|---|---|---|---|---|---|
| | | Bounds | 500 | 1000 | 50 | 100 | | | | |
| 1 | 500 | 1400 | 1000 | 2000 | 60 | 90 | {1, 2, 3} | 5.2 | | |
| 2 | 600 | 1400 | ... | ... | ... | ... | {1, 2, 3} | 5.6 | | |
| 3 | 400 | 1400 | | | | | {2, 3, 4} | 5.3 | | |
| 4 | 500 | 1200 | | | | | {1, 2, 3} | 4.3 | | Better Neighbor |
| 5 | 600 | 1200 | | | | | {1, 2, 3} | 4.5 | | |
| 6 | 500 | 1000 | | | | | {1, 2, 3} | 4.3 | | |
| 7 | 400 | 1200 | | | | | {2, 3} | 3.1 | | Better Neighbor |
| 8 | 400 | 1000 | | | | | {2, 3} | 3.2 | | |
| 9 | 300 | 1200 | | | | | {3, 4} | 2.1 | | Better Neighbor |
| 10 | 300 | 1400 | | | | | {3, 4} | 2.2 | | |
| 11 | 200 | 1200 | | | | | {4} | 1.1 | | |
| 12 | 300 | 1000 | 400 | 900 | 40 | 90 | ∅ | 0 | 3.4 | Allowable |
| 13 | 300 | 800 | ... | ... | ... | ... | | | 3.6 | |
| 14 | 200 | 1000 | | | | | | | 2.8 | Better Allowable |
| 15 | 200 | 800 | | | | | | | 2.9 | |
| 16 | 100 | 1000 | | | | | | | 2.5 | Better Allowable |
| 17 | 100 | 1200 | | | | | | | 2.7 | |
| 18 | 100 | 800 | | | | | | | 2.4 | Better Allowable |
| 19 | 100 | 600 | 200 | 500 | 30 | 80 | | | 2.3 | Suboptimal |
| 20 | 200 | 600 | ... | ... | ... | ... | | | 2.5 | |
| 21 | 100 | 400 | | | | | | | 2.4 | |

FIG. 9B

| Workload Characteristic, W | Suboptimal Parameters, P* | |
|---|---|---|
| QD | P* 1 | P* 2 |
| 1 | 100 | 600 |
| 32 | 250 | 1800 | ns
FIRMWARE PARAMETERS OPTIMIZING SYSTEMS AND METHODS

BACKGROUND

1. Field

Embodiments of the present disclosure relate to a scheme for optimizing firmware parameters in a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). Memory systems may include various components such firmware (FW) and hardware (HW) components. Firmware contains parameters that effect operating conditions. In this context, embodiments of the invention arise.

SUMMARY

Aspects of the present invention include a system and a method for optimizing for firmware parameters.

In one aspect, a data processing system including a host and a memory system, which includes a memory device and a controller including firmware. The controller receives, from the host, a set workload among multiple workloads, each workload including a corresponding restriction on performance metrics. The controller searches for a suboptimal (i.e. local optimal) parameter set satisfying restrictions for all workloads among multiple parameter sets for the firmware, based on the set workload, each parameter set including a plurality of parameters, each parameter associated with one or more performance metrics of the memory system.

In another aspect, a method for operating a memory system coupled to a host includes: receiving, from the host, a set workload among multiple workloads, each workload including a corresponding restriction on performance metrics; and searching for a suboptimal parameter set satisfying restrictions for all workloads among multiple parameter sets for firmware, based on the set workload, each parameter set including a plurality of parameters, each parameter associated with one or more performance metrics of the memory system.

Additional aspects of the present invention will become apparent from the following description.

BRIEF DESCRIPTION OF THE DRAWINGS

FIGS. 9A and 9B are tables illustrating examples of a suboptimal firmware search algorithm in accordance with an embodiment of the present invention.

DETAILED DESCRIPTION

Figure 1:
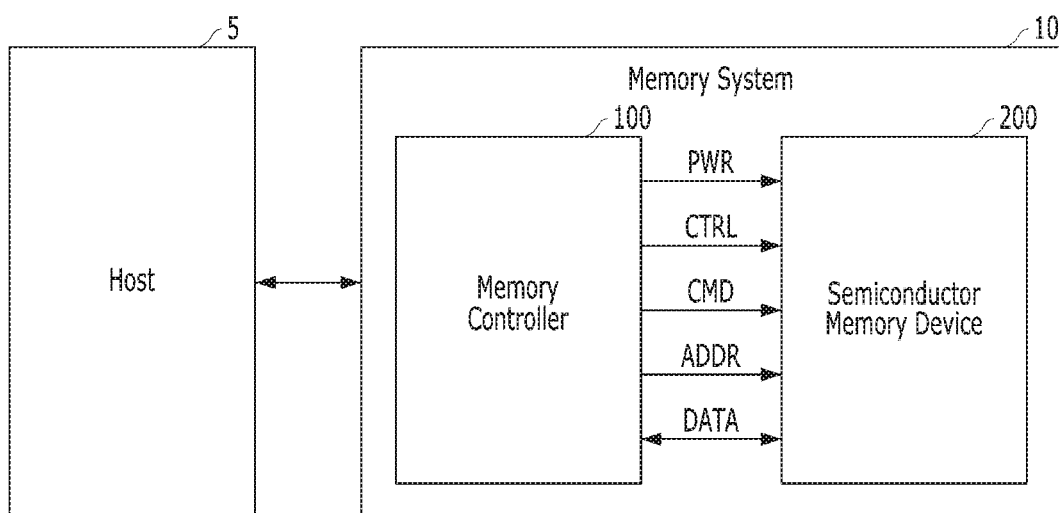
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operation of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
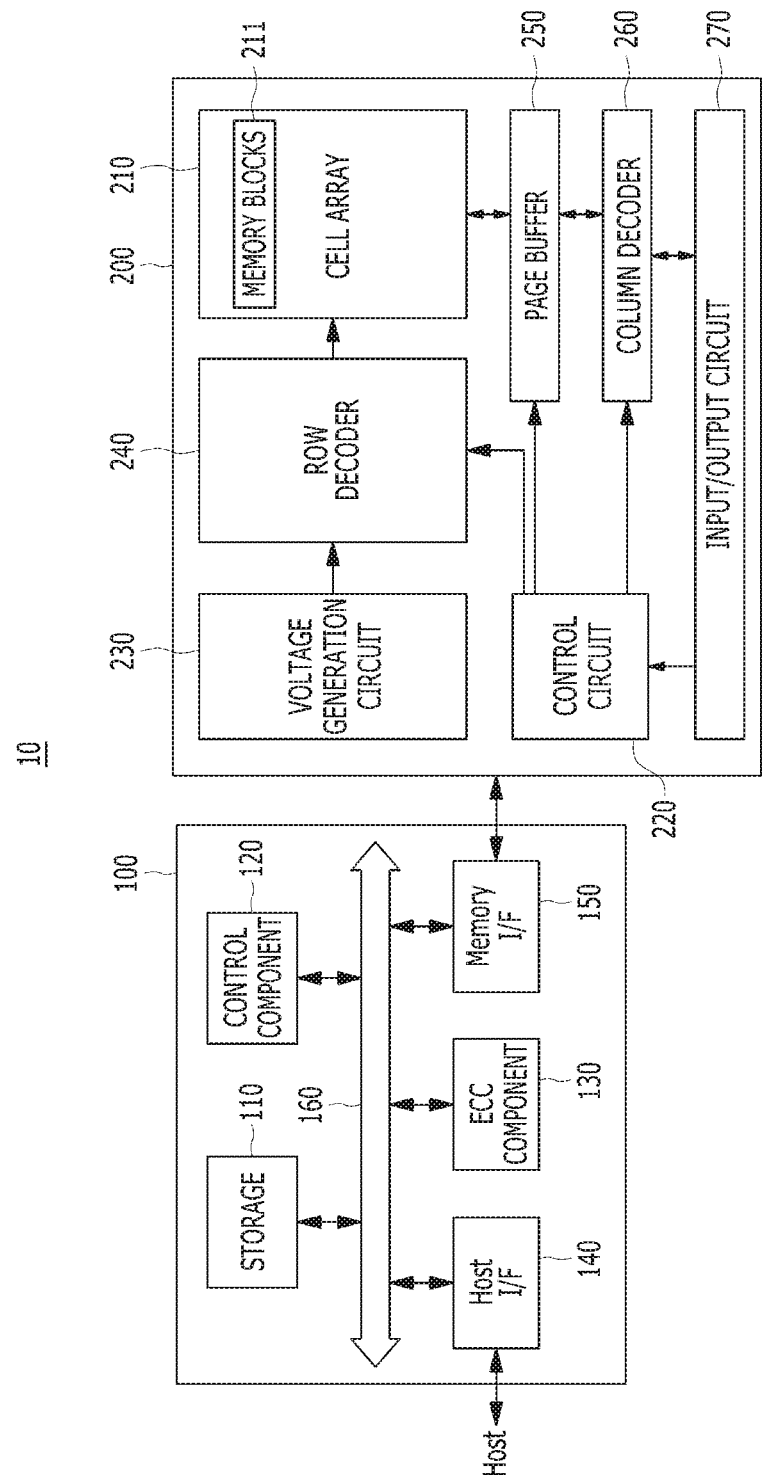
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operation of the memory system 10, and in particular a write operation and a read operation for the memory device 200, in response to a corresponding request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and/or an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation on the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
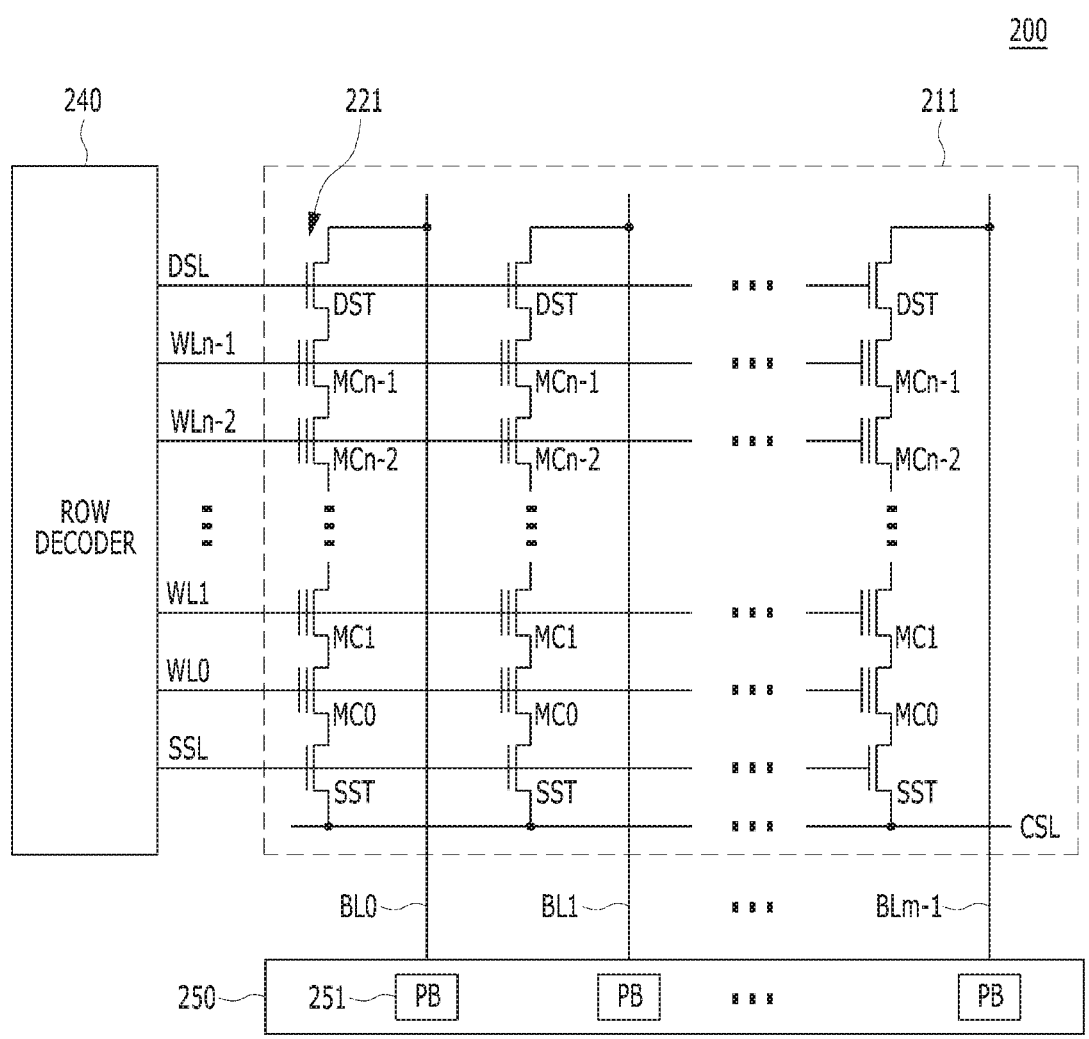
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address, FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a single level cell (SLC) storing 1 bit of data, a multi-level cell (MLC) storing 2 bits of data, a triple-level cell (TLC) storing 3 bits of data, or a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include NAND-type flash memory cells. However, the memory blocks 211 are not limited to such cell type, but may include NOR-type flash memory cells. Memory cell array 210 may be implemented as a hybrid flash memory in which two or more types of memory cells are combined, or one-NAND flash memory in which a controller is embedded inside a memory chip.

Figure 4:
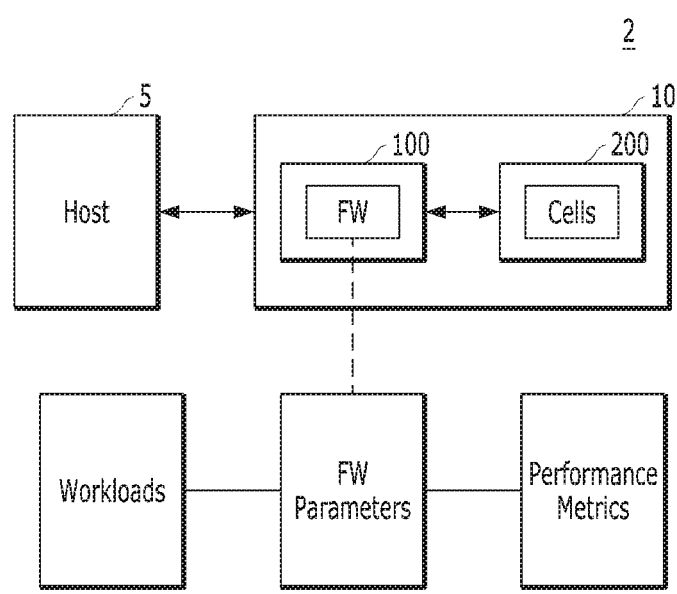
FIG. 4 is a diagram illustrating a data processing system in accordance with an embodiment of the present invention.

FIG. 4 is a diagram illustrating a data processing system 2 in accordance with an embodiment of the present invention.

Referring to FIG. 4, the data processing system 2 may include a host 5 and a memory system 10. The memory system 10 may include a controller 100 and a memory device 200. The controller 100 may include firmware (FW) as a specific class of software for controlling various operations (e.g., read, write, and erase operations) for the memory device 200. In some embodiments, the firmware may reside in the storage 110 and may be executed by the control component 120, in FIG. 2.

The memory device 200 may include a plurality of memory cells (e.g., NAND flash memory cells). The memory cells are arranged in an array of rows and columns as shown in FIG. 3. The cells in a particular row are connected to a word line (e.g., WL0), while the cells in a particular column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line.

In the memory system 10 such as a solid state drive (SSD), performance metrics such as throughput, latency, and consistency are important. Customers may require a certain minimal throughput and consistency. The requirements for latency contain maximum values in terms of percentiles up to 99.999999% (also referred to as eight nines or 8th nine level). Different requirements are given for different specific workloads of interest to customers.

Integrated circuits manufacturing technology, architectures of NAND and system on a chip (SoC), and frequencies and timings of hardware (HW) components, such as a controller and a memory (e.g., a dynamic random access memory (DRAM)) significantly affect the performance of the memory system 10. Also, firmware (FW) algorithms use many parameters which should be tuned in an optimal way from a performance point of view. Unlike HW characteristics, FW parameters may be tuned on the fly. In order to improve one performance metric (e.g., read latency), some FW parameters should be changed. However, changing FW parameters to improve one performance metric may affect performance of another metric (e.g., write latency). For example, changes in FW parameters may improve latencies for some nines and worsen latencies for others. Moreover, there may be analogical contradictions with regard to FW parameters for different workloads. For example, good parameters for one type of workload may be bad for other types of workloads. These contradictions complicate the selection of the optimal FW parameters.

Selection of optimal FW parameters is a poorly formalized process based on trial and error and is one of the most resource-consuming and time-consuming operations. Due to this complexity, it is difficult to find a common parameter set, as a compromise, that satisfies restrictions on performance metrics for all workloads. Accordingly, embodiments provide a scheme to search for and find FW parameter set, that works for all workloads and parameter sets that are specific for a particular type of workload. Embodiments obtain through search and tuning different sets of parameters for different workloads. By having workload characteristics and a set of parameters for each type of workload, it is possible to improve customers' performance metrics of the memory system.

In some embodiments, the controller 100 may receive, from the host 5, a particular workload among multiple workloads, each workload including a set restriction on performance metrics. Further, the controller 100 may search for a compromise parameter set satisfying restrictions for all workloads among multiple parameter sets for firmware, based on the particular workload. Each parameter set may include a plurality of parameters. Each parameter may be associated with one or more performance metrics of the memory system 10.

In some embodiments, the search for the compromise parameter set may be conducted in a development stage of the firmware.

In some embodiments, the controller 100 may adjust the compromise parameter set to generate a suboptimal parameter set using a table indicating an association between workloads and suboptimal parameter sets after the development stage of the firmware.

In some embodiments, the controller 100 may adjust the compromise parameter set in response to receiving a particular workload from the host.

In some embodiments, the performance metrics may be associated with throughput, latency and/or consistency.

In some embodiments, each of the multiple workloads may be defined by any combination of a queue depth of the host, a ratio of read to write of data for the memory system, a ratio of sequential data to random data for the memory system, a block size of a command for the memory system and other characteristics.

In some embodiments, the controller 100 may search for a compromise parameter set among multiple parameter sets respectively represented by points in a parameter space. The compromise parameter set, denoted an allowable point in the parameter space, satisfies all constraints of the multiple workloads.

In some embodiments, the controller 100 may conduct the search by selecting a starting point among multiple points in the parameter space; calculate first object function values of the starting point and neighboring (adjacent) points, each first object function value indicating an extent of violation of one or more aspects of a given workload; select a better point with a lower first object function value; and repeat the calculation operations for the better point and neighboring points. This process continues until an allowable point without violating corresponding restrictions of the multiple workloads is obtained.

In some embodiments, the controller 100 may calculate second object function values of the allowable point and neighboring (adjacent) points, each second object function value indicating a ratio of a respective one of the multiple workloads to a corresponding restriction of the respective workload; select a better allowable point with a lower second object function value; repeat the calculation operations for the better allowable point and neighboring points. This process may continue until a point with a lowest second object function value is found, which point represents the compromise parameter set.

In some embodiments, the starting point may be randomly selected among the multiple points.

As described, in order to search for a compromise parameter set, the controller 100 may perform operations such as calculations of first and second object function values and selecting better points and better allowable points. These operations are described below with reference to FIGS. 8 to 9A.

Figure 5:
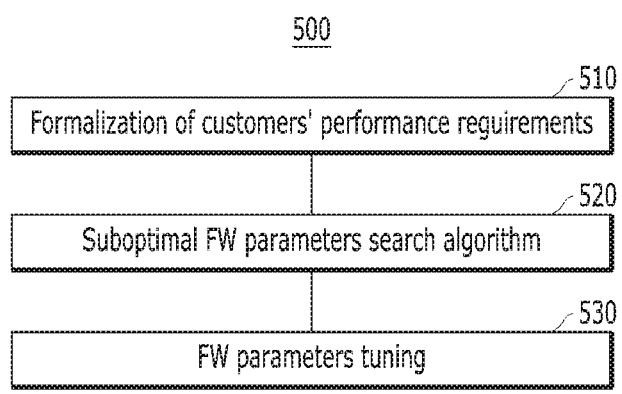
FIG. 5 is a flowchart illustrating an optimal firmware search scheme in accordance with an embodiment of the present invention.

FIG. 5 is a diagram illustrating an optimal firmware (FW) parameter search scheme 500 in accordance with an embodiment of the present invention.

Referring to FIG. 5, the optimal FW parameter search scheme 500 may include a preliminary stage 510, a base stage 520 and an application stage 530. In the preliminary stage 510, customers' performance requirements may be formalized. In the base stage 520, a search may be conducted to find the suboptimal FW parameters. In the application stage 530, the suboptimal FW parameters may be tuned.

In some embodiments, the preliminary stage 510 and the base stage 520 may be performed in the development stage of the firmware of the memory system 10 (e.g., a solid state drive (SSD)). The application stage 530 may represent a period in which the firmware is applied to and is running on the SSD. FW parameters obtained in the preliminary stage 510 and the base stage 520 may be nonoptimal for the application stage 530. In order to obtain suboptimal FW parameters, FW parameters may be adjusted (or tuned) in the application stage 530, in consideration of differences (or changes) of parameters between two stages.

Figure 6A:
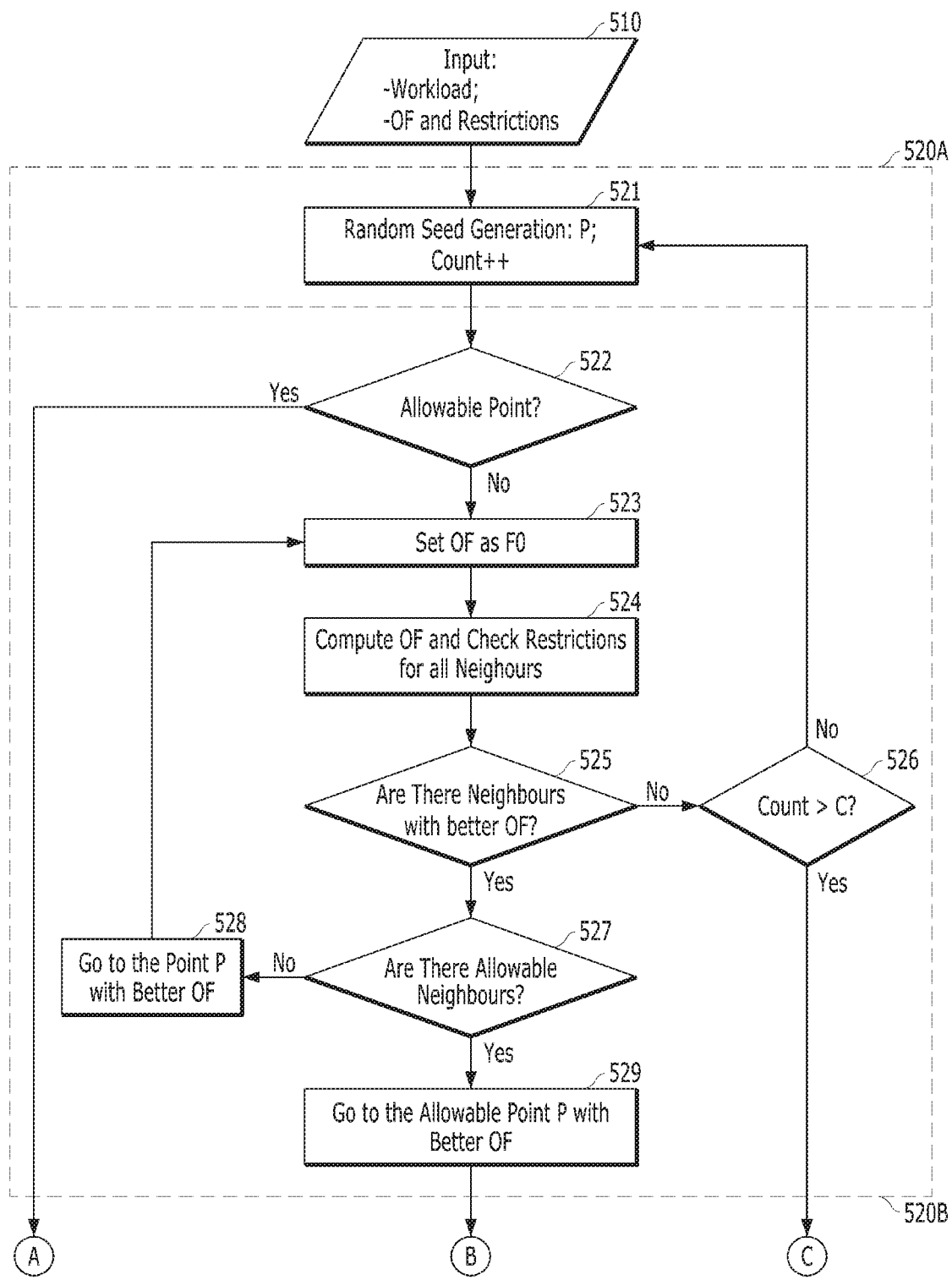
FIGS. 6A and 6B are flowcharts illustrating details of an optimal firmware search scheme in accordance with an embodiment of the present invention.
Figure 6B:
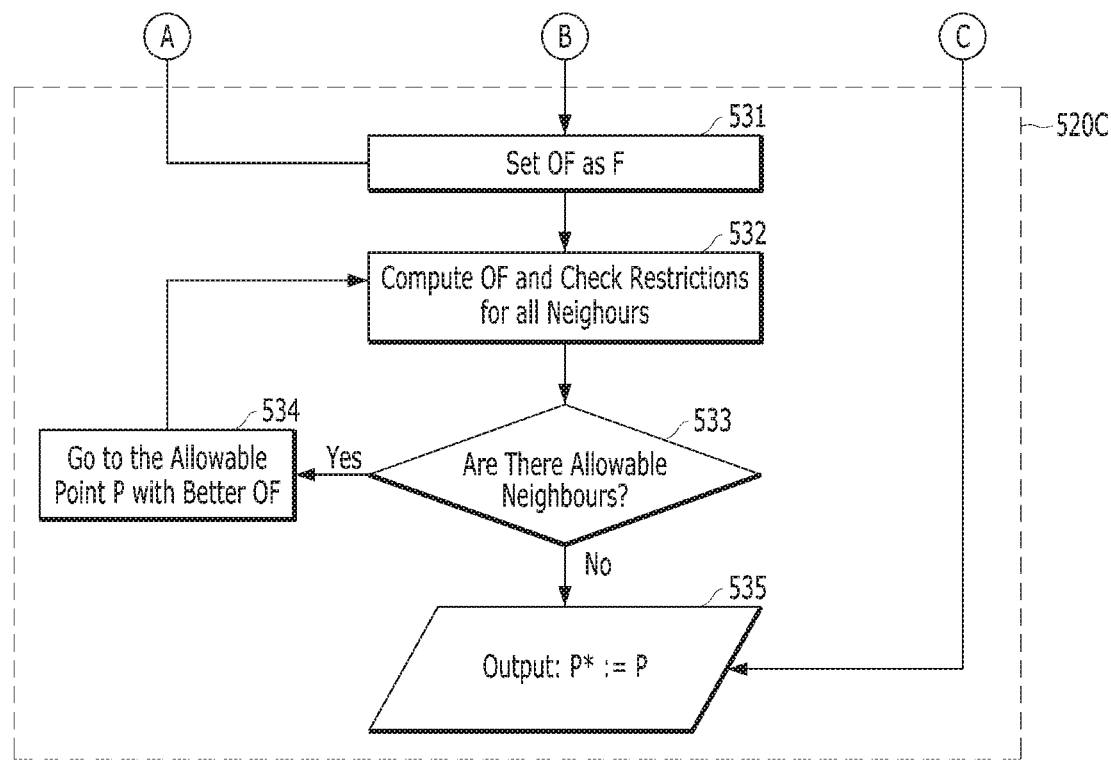

FIGS. 6A and 6B are flowcharts illustrating details of the suboptimal firmware (FW) parameter search scheme 500 of FIG. 5 in accordance with an embodiment of the present invention.

Referring to FIGS. 6A and 6B, the preliminary stage 510 and phases 520A to 520C are illustrated. Phases 520A to 520C correspond to the base stage 520 of FIG. 5. Phase 520A includes operation 521. Phase 520B includes operations 522 to 529. Phase 520C includes operations 531 and 535. Details of each stage are described hereinbelow.

Preliminary stage 510 (Formalization of customers' performance requirements).

Optimal behavior of a memory system (e.g., SSD) means that some performance metrics should be minimal or maximal under some constraints on other performance metrics. For example, throughput should be maximal under constraint that all percentiles of read and write latencies up to $8^{th}$ nine level should be less than given values. Another example, average latency should be minimal under constraint that standard deviation of throughput should be less than a given value. At the preliminary stage 510, an objective function (OF) and restrictions for a given workload may be determined based on customers' requirements. Examples of an OF and restrictions are shown in FIG. 9A. These requirements may be from the customer. If FW parameters are changed, corresponding performance metrics and OF will change too. It means OFs are implicit functions of parameters. An OF and associated restrictions may be considered as an input for the optimal FW parameter search scheme 500.

In some embodiments, customers' performance metrics may be taken into account for mathematical formulation of the following: throughput or input/output per second (IOPS); average read and write latencies; percentiles of read and write latencies on different 9's levels; consistency (i.e., a ratio of a certain percentile of IOPS distribution to the average IOPS), and standard deviations of throughput and latencies.

In order to obtain optimal FW parameters for a given workload, two stages mathematical formulation is possible. At the first stage, IOPS as the OF to be maximized under the restrictions that read and write latencies on different 9's levels should be less than set values. At the second stage, OF for i-th ($i=\overline{1,n}$) workload can be represented as an integral metric combining latencies on different 9's levels with corresponding restrictions. In the latter case, the OF defined by Equation 1:

$$F_i(P) = \sum_{j=1}^{m} w_{ij}\mu_{ij}(P) \to \min_P, P_i^* = \arg\min_P\{F_i(P):\mu_{ij}(P) \le \mu_{ij}^*, j = \overline{1,m}\} \quad (1)$$

In Equation 1, m is a number of metrics of restrictions, $w_{ij}$ are weight coefficients of the significance of j-th metric, $\mu_{ij}$ are j-th nine-level, and $\mu_{ij}^*$ are upper bounds for the allowable values of the metrics. Through Equation 1, the minimum OF is searched among all allowable parameters' points and the search is carried out with restriction that the IOPS metric value shouldn't get worse than the one found on the first stage. Weight coefficients reflect the importance of a certain 9's level for a customer.

In some embodiments, the optimal FW parameter search scheme may be applied sequentially to several OFs, with any new OF and new restriction added. In order to search for a compromise FW parameter set satisfying restrictions for all workloads, OF is defined by Equation 2:

$$F(P) = \sum_{i=1}^{n} F_i(P) \to \min_P, \quad (2)$$

$$P^* = \arg\min_P\{F(P):\mu_{ij}(P) \le \mu_{ij}^*, i = \overline{1,n}, j = \overline{1,m}\}$$

Base stage 520 (Suboptimal FW parameters search algorithm).

Referring to FIGS. 6A and 6B, the suboptimal FW parameter search algorithm may include a random seed generation phase 520A, an allowable point search phase 520B and an optimization phase 520C, Phase 520A includes operation 521, phase 520B includes operations 522 to 529 and phase 520C includes operations 531 and 535. It is assumed that the workload is stable while the suboptimal FW parameter search algorithm is executed and OF with restrictions are predefined as described in the preliminary stage 510.

Every parameter p_i(i=1, . . . , I) may have many possible values. Each parameter set P=(p_1, . . . , p_I) may be considered as a point among multiple points in a parameter space. The parameter space may include multiple parameter sets, and each parameter set may correspond to each point.

At each step of the base stage after performing 526, the suboptimal FW parameter search algorithm may change one parameter in the parameter set to an adjacent possible value (i.e., smaller or larger value) to form a new parameter set and may compute OF for the new parameter set (524). Such new parameter set may be associated with a neighbor point adjacent to a set point in the parameter space. Then, the suboptimal FW parameter search algorithm may check if constraints (or restrictions) are satisfied for every neighbor point (524). In order to compute OF and check the restrictions, the performance metrics may be evaluated from measurements of the real memory system (e.g., SSD) or from modeling with a given set of FW parameters. The suboptimal FW parameter search algorithm may search for an allowable point which is a parameter set for which performance metrics satisfy all constraints.

At the random seed generation phase 520A, values of the initial parameter set may be generated randomly in the parameter space. The stage 520A may be repeated C times, which may be controlled with a counter. In some embodiments, for maximum variability, the next random seed generation may be done without reiterations of the same values for all parameters.

At the allowable point search phase 520B, for the point corresponding to current random seed, restrictions for all workloads may be checked to determine whether the current point is an allowable point satisfying restrictions for all workloads (522). If it is determined that the current point is an allowable point, the optimization phase 520C starts. Else, the OF may be defined (523) by Equation 3:

$$F_{0i}(P) = \Sigma_{j \in J} w_{ij} \mu_{ij}(P)(F_0(P) = \Sigma_{i=1}^n F_{0i}(P) \text{ for compromise solution}) \quad (3)$$

In Equation 3, J is a set of indices for those metrics $\mu_{ij}$ for which constraints are violated. All other metrics satisfying constraints may be used as restrictions for optimization.

The suboptimal FW parameter search algorithm may search for an allowable point with better OF value among neighbor points (525-528). If an allowable point is found (yes at 527), the suboptimal FW parameter search algorithm may start the optimization phase 520C (529). If it is determined that no allowable point is present, the suboptimal FW parameter search algorithm may find and go to a point that is better than the initial one.

The optimization phase 520C may begin with a current allowable point which is obtained in the allowable point search phase 520B (531). The optimization phase 520C may check whether the neighbors adjacent to the allowable current point are also allowable (533). For each of the allowable neighbors, OF may be computed and a point with a better OF may be found (532, 534). The optimization phase 520C may be repeated until all allowable neighbors are checked (533). In some embodiments, after being checked, allowable neighbor points may be stored in an array to avoid recheck.

According to the suboptimal FW parameter search algorithm in FIGS. 6A and 6B, every transition to a better point may be accompanied by a calculation of OF for all 2l neighbors in the worst case, where l is a number of FW parameters. Therefore, for every generated random initial point, the algorithm may require knowledge of maximum 2lS points, where S is a number of transitions to the next better point. This number essentially depends on an unknown relation between FW parameters and OF; in its turn this relation is determined by the drive characteristics such as processors and memory clocks, NAND operation timings, numbers of dies, planes, blocks, pages, channels, cores etc. The calculation of metrics for a given FW parameter set may be the most resource-consuming and time-consuming part of the algorithm because it requires running (or modeling) of a huge number of host commands. Additional heuristic rules may be added to the suboptimal FW parameter search algorithm. For example, if all neighbors have the same OF values, the step of parameters change may be increased. If parameters are near bounds, the step may be decreased. An example of the suboptimal FW parameter search algorithm is described with reference to FIGS. 8, 9A and 9B.

Application stage 530 (FW parameters tuning).

The suboptimal FW parameter set, which is found by the search algorithm in FIGS. 6A and 6B, may be used in different applications. In some embodiments, a scheme may be applied to suboptimal FW parameters found during the late FW development stage for stable FW releases to tune or align such parameters for a particular application. In this case, the suboptimal FW parameters have to be found in advance by modeling or experiments with a real SSD. In order to obtain suboptimal FW parameters, the predefined compromise parameter set and/or a correspondence table indicating a relationship of "workload characteristics-suboptimal parameters" or "workload-parameter" (i.e., W2P table) may be written as a part of the flash translation layer (FTL) FW code. This association of the suboptimal FW parameter set to an application may be similar to application of a read retry table (RRT), when shifts of read voltage thresholds are defined during the development stage. Such RRT is described in U.S. Patent Application Publication No. US 2019/0108091 A1, entitled "SELF-PRIORITIZING ADAPTIVE RETRY THRESHOLD ADJUSTMENT".

Figure 7:
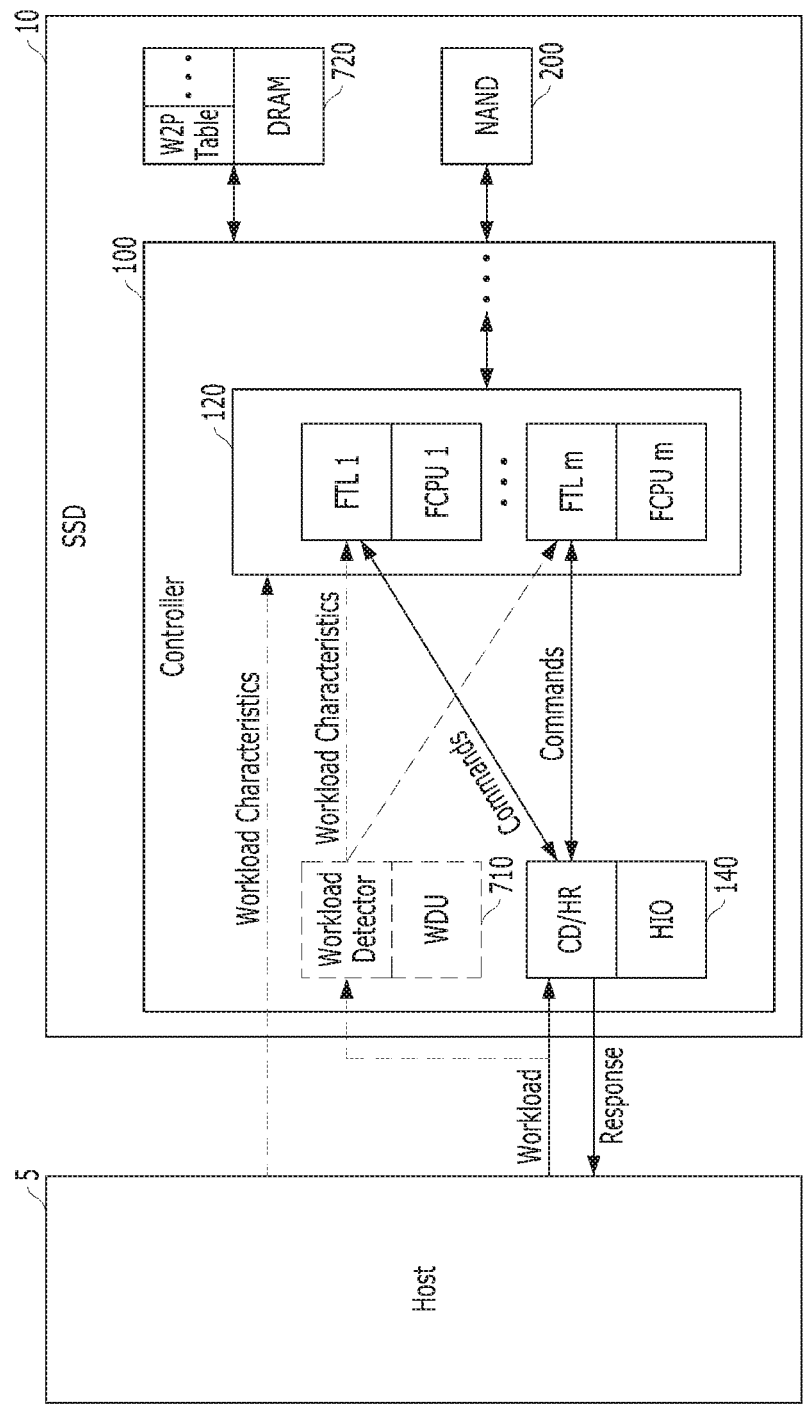
FIG. 7 is a diagram illustrating a data processing system including a workloads-parameters (W2P) table in accordance with an embodiment of the present invention.

FIG. 7 is a diagram illustrating a data processing system including a workload to parameter set (W2P) table in accordance with an embodiment of the present invention.

Referring to FIG. 7, the data processing system may include a host 5 and a memory system (e.g., a solid state drive (SSD)) 10. The SSD 10 may include a controller 100 and a memory device (e.g., NAND flash memory device) 200. The controller 100 may include a control component 120 and a host input/output (HIO) component as a host interface 140 of FIG. 2. The control component 120 may include flash central processor units (FCPUs) FCPU1 to FCPUm). Firmware (FW) may be executable by each FCPU. A dynamic random access memory (DRAM) 720 may be coupled to the controller 120. In another embodiment, the DRAM 720 may be implemented within the storage 110 of the controller 100 in FIG. 2. W2P table may be uploaded into the DRAM 720. Although not shown in FIG. 7, the controller 100 may include various other components as shown in FIG. 2.

In some embodiments, W2P table may be implemented as shown in Table1:

Table1:

TABLE 1

| Workload Characteristics, W | | | FW parameters, P* | | |
|---|---|---|---|---|---|
| w_1 | ... | w_r | P*_1 | ... | P*_l |
| w_11 | ... | w_1r | p_11 | ... | p_1l |
| ... | ... | ... | ... | ... | ... |
| w_t1 | ... | w_tr | p_t1 | ... | p_tl |

Referring to Table1, the W2P table contains t records with values of r workload characteristics and l corresponding FW parameters. An example of W2P table is given in FIG. 9B, where r=1, l=2, t=2 and w_1 is a host queue depth (QD).

The host 5 may be coupled to FW (not shown) of the controller 100 which may be coupled to the memory device (i.e., NAND flash) 200. Workload(s) may be obtained from the host 5 and may be sent to a command dispatcher (CD) of HIO 140 and a workload detector of a workload detector unit (WDU) 710. A host responder (HR) may respond back to the host 5 to notify it as to which commands have been executed (i.e., responses). The workload detector may detect workload characteristics from the host 5. One of the possible example of workload detector is described in U.S. Patent Application Publication No. US 2019/0303043 A1, entitled "WORKLOAD PREDICTION IN MEMORY SYSTEM AND METHOD THEREOF" and incorporated by reference herein. The workload detector may be connected to all flash translation layers (FTLs), which are executed in different FCPUs. Further, the workload detector may provide detected workload characteristics to all FTLs by the inter-process communication (IPC) protocol. In other embodiments, the workload detector may be implemented in the host 5 or as a part of a FW or HW module of SSD 10. For example, the workload detector may be located on the host side and transmit workload characteristics to FTLs as service protocol information.

Workloads may be characterized by vectors W=(w_1, . . . , w_r) of workload characteristics with elements, such as a host queue depth (QD), a read/write ratio (RWR) indicating a ratio of read to write of data for the memory system, a sequential/random ratio (SRR) indicating a ratio of sequential data to random data for the memory system, a block size of a command (CBS), etc. The workload detector may detect the current workload characteristics during a set time window or period. Then, the control component 120 (i.e., FTL) may tune (or adjust) previous obtained suboptimal FW parameters using the W2P table. Instead of using the W2P table, the suboptimal FW parameters (vector P) may be interpolated in the form P*=f(W) as a function of workload characteristics vector W and the obtained dependencies therebetween may be written in FW.

In other embodiments, an optimal FW parameter search scheme may be implemented directly into FW based on the measurement of performance characteristics during running of the memory system and parameters changing on the fly.

EXAMPLES

As an example of application of the optimal firmware search scheme, a suspension of low-priority operations (LPOs), such as program and erase may be considered. Program suspension is described in U.S. Patent Application Publication No. US 2016/0313946 A1, entitled "CONTROLLER ADAPTATION TO MEMORY PROGRAM SUSPEND-RESUME" and incorporated by reference herein.

Suspension is one of the algorithms for improving read access latency. Program suspension may be controlled in FW by several parameters, one of which characterizes a number of host read commands that can be served during suspend, and another characterizes the minimal duration of program partition before program operation may be suspended (define this parameter by p_1). The analogical suspension scheme can be realized for the erase operation. The parameter of the minimal duration of erase partition before the erase operation may be suspended is defined by p_2. Parameters p_1, p_2 are measured in time units, e.g., microseconds, and can change within respective ranges. In order to improve read latency, parameters p_1, p_2 should be decreased, but these changes also may affect write latency in the opposite way.

Assume that a customer has only two workloads (n=2) with CBS=4K, SRR=0, RWR=7/3, QD=1 and QD=32. Suppose that the customer wants to minimize percentiles of read and write latencies on 1st nine level (i.e., 90% of commands) and 2nd nine level (i.e., 99% of commands) and that there are upper bounds on the allowable values for these nines levels. Assume also that both read and write latencies are equally important to the customer, as well as relative improvements of any nines from their upper bounds. According to the customer's requirement, OF for i-th workload (i=2) with restrictions is defined in the following Equation 4:

$$F_i = \sum_{j=1}^{4} \frac{\mu_{ij}}{\mu_{ij}^*}, \mu_{ij} \le \mu_{ij}^*, j = \overline{1, 4} \quad (4)$$

In Equation (4), $\mu_{ij}$ are two percentiles of read latency (j=1, 2) and write latency (j=3, 4), respectively.

Figure 8:
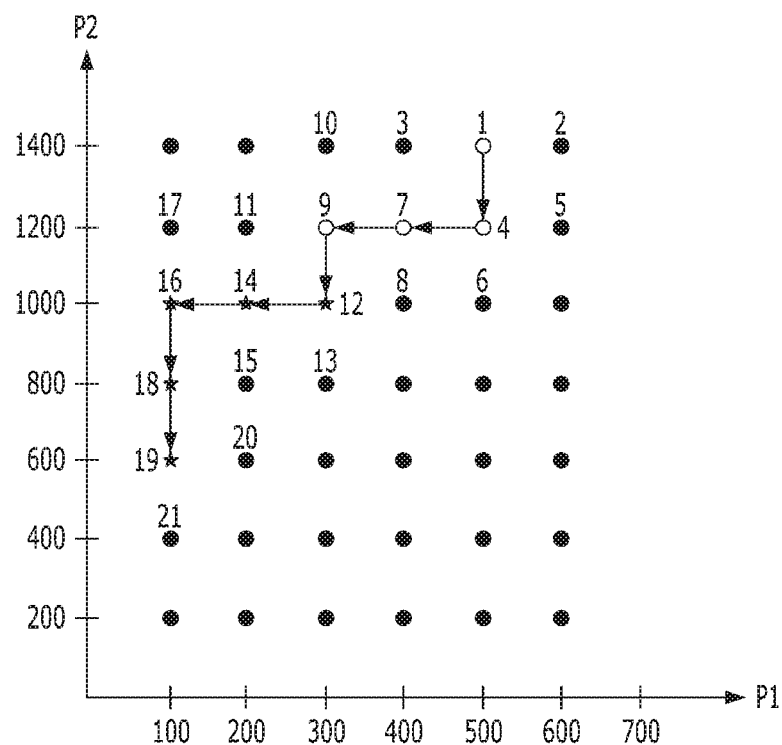
FIG. 8 is a graph illustrating an example of a suboptimal firmware search algorithm in accordance with an embodiment of the present invention.

FIG. 8 is a graph illustrating an example of a suboptimal firmware search algorithm in accordance with an embodiment of the present invention. FIGS. 9A and 9B are tables illustrating examples of a suboptimal firmware search algorithm in accordance with an embodiment of the present invention. P1 and P2 in FIG. 8 represent FW parameters P1, P2 in FIG. 9A, respectively. Specifically, FIGS. 8 and 9A describes the search algorithm in detail for the first workload with QD=1 on hypothetical latency values. Real latency values, dependent on the workload characteristics and FW parameters, may be found by measuring on the drive or by modeling of the drive.

In phase 520A of FIG. 6A, operation 521 generates a random seed of point 1 with coordinates (500, 1400).

In phase 520B of FIG. 6A, it is determined that point 1 (500, 1400) is an unallowable point, a set of indices of violated restrictions is J={1, 2, 3} and first object function (OF) F {01}=1000/500+2000/1000+60/50=5.2. Herein, values of 1000, 2000 and 60 represent respective violated performance metrics and values of 500, 1000 and 50 represent respective restrictions of corresponding violated performance metrics, as shown in FIG. 9A. In other words, the first object function value may indicate a violation of a restriction of performance metrics for the first workload by a ratio of the corresponding metric values to its restriction. The restrictions and OF F {01} for all neighbors 2, 3, 4 are checked and the better neighbor point 4 with minimal OF value (i.e., lowest first OF value) F {01} (i.e., 4.3) is chosen.

The algorithm continues in that manner, passing through points 7, 9, and 12. At point 12 with coordinates (300, 1000), all restrictions are satisfied (J=∅, F {01}=0). Thus, point 12 is determined to be an allowable point, and it is calculated that second OF F1=400/500+900/1000+40/50+90/100=3.4. Herein, values of 400, 900, 40 and 90 represent respective performance metrics and values of 500, 1000, 50 and 100 represent respective restrictions of performance metrics for the corresponding workloads, as shown in FIG. 9A. In other words, the second object function value may indicate a deviation of performance metrics from their restrictions for the first workload by a ratio of the corresponding metric values to its restriction. Therefore, the algorithm transitions to the next phase 520C.

In phase 520C of FIG. 6B, all neighbors are checked and the better allowable neighbor point 14 with the minimal (i.e., lowest second OF value) F1 is chosen. Continuing this process, the algorithm finds a suboptimal point 19 with F1(=200/500+500/1000+30/50+80/100=2.3). Through application of this algorithm, a suboptimal parameter set (P*_1, P*_2)=(100, 600) is found.

Similarly, the algorithm is performed for the second workload with QD=32. As a result, a suboptimal parameter set (P*_1, P*_2)=(250, 1800) is found.

For two workloads above, an example of the corresponding W2P table is illustrated in FIG. 9B.

Figure 10:
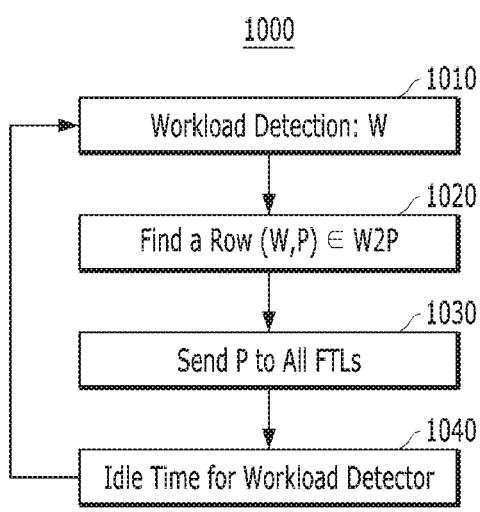
FIG. 10 is a flowchart illustrating a firmware (FW) parameter tuning operation in accordance with an embodiment of the present invention.

FIG. 10 is a flowchart illustrating a firmware (FW) parameter tuning operation 1000 in accordance with an embodiment of the present invention. The operation 1000 may correspond to the application stage 530 of FIG. 5 and may be performed by the controller 100 in FIGS. 4 and 7.

Referring to FIG. 10, at operation 1010, the controller 100 may detect workload W by the workload detector. At operation 1020, the controller 100 may find parameter P corresponding to the detected workload W in the W2P table, i.e., a row (W, P) in the W2P table. At operation 1030, the controller 100 may send the parameter P to all FTLS of the control component 120. At operation 1040, the controller 100 may wait an idle time for the workload detector. After performing the operation 1040, the controller 100 may proceed to the operation 1010 and may perform operations 1010 to 1030 repetitively.

As described above, embodiments provide a scheme for searching for suboptimal firmware (FW) parameters, which works for all workloads and for all types of FW parameters. The suboptimal firmware parameters may then be tuned for a specific application. Thus, embodiments provide a set of parameters for every workload, as well as tuned parameters for specific workloads, thus improving customers' performance metrics of the memory system.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A data processing system comprising:
a host; and
a memory system coupled to the host and including a memory device and a controller for controlling the memory device, wherein the controller includes firmware and is configured to:
receive, from the host, a set workload among multiple workloads, each workload including a corresponding restriction on performance metrics; and
search for a suboptimal parameter set satisfying restrictions for all workloads among multiple parameter sets for the firmware, based on the set workload, each parameter set including a plurality of parameters, each parameter associated with one or more performance metrics of the memory system,
wherein the suboptimal parameter set is searched for in a development stage of the firmware.

2. The data processing system of claim 1, wherein the controller is further configured to:
adjust the suboptimal parameter set using a table indicating an association between workloads and respective suboptimal parameter sets after the development stage of the firmware.

3. The data processing system of claim 2, wherein the controller is further configured to adjust the suboptimal parameter set in response to a workload received from the host.

4. The data processing system of claim 1, wherein the one or more performance metrics are associated with one or more of throughput, latency and consistency.

5. The data processing system of claim 1, wherein each of the multiple workloads includes a combination of two or more of a queue depth of the host, a ratio of read to write of data for the memory system, a ratio of sequential data to random data for the memory system, and a block size of a command for the memory system.

6. The data processing system of claim 1, wherein the controller is configured to search for multiple points in a parameter space, each corresponding to one of the multiple parameter sets, to identify an allowable point, the corresponding suboptimal parameter set of which does not violate any restrictions for any of the multiple workloads.

7. The data processing system of claim 1, wherein the controller is configured to:
select a starting point among multiple points in a parameter space, each point corresponding to a respective one of the parameter sets;
calculate first object function values of the starting point and neighboring points adjacent to the starting point, each first object function value indicating a violation of a restriction of one or more workloads;
select a better point with a lower first object function value among the first object function values;
repeat the calculation operations for the better point and neighboring points adjacent to the better point; and
continue the calculate, select and repeat operations until an allowable point corresponding to one of the parameter sets that does not violate any restrictions of any of the multiple workloads is identified.

8. The data processing system of claim 7, wherein the controller is further configured to:
calculate second object function values of the allowable point and neighboring points adjacent to the allowable point, each second object function value indicating a ratio of the corresponding workload to its restriction;
select a better allowable point with a lowest second object function value among the second object function values;
repeat the calculation operations for the better allowable point and neighboring points adjacent to the better allowable point; and
determine, as the suboptimal parameter set, a point with a lowest second object function value among the calculated second object function values.

9. The data processing system of claim 7, wherein the starting point is randomly selected among the multiple points.

10. A method for operating a memory system coupled to a host, the method comprising:
receiving, from the host, a set workload among multiple workloads, each workload including a corresponding restriction on performance metrics; and
searching for a suboptimal parameter set satisfying restrictions for all workloads among multiple parameter sets for firmware, based on the set workload, each parameter set including a plurality of parameters, each parameter associated with one or more performance metrics of the memory system,
wherein the suboptimal parameter set is searched for in a development stage of the firmware.

11. The method of claim 10, further comprising:
adjusting the suboptimal parameter set using a table indicating an association between workloads and respective optimal parameter sets after the development stage of the firmware.

12. The method of claim 11, wherein the suboptimal parameter set is adjusted in response to a workload received from the host.

13. The method of claim 10, wherein the one or more performance metrics are associated with one or more of throughput, latency and consistency.

14. The method of claim 10, wherein each of the multiple workloads includes a combination of two or more of a queue depth of the host, a ratio of read to write of data for the memory system, a ratio of sequential data to random data for the memory system, and a block size of a command for the memory system.

15. The method of claim 10, wherein the searching for the suboptimal parameter set comprises:
   searching for multiple points in a parameter space, each corresponding to one of the multiple parameter sets, to identify an allowable point, the corresponding parameter set of which does not violate any restrictions for any of the multiple workloads.

16. The method of claim 10, wherein the searching for the suboptimal parameter set comprises:
   selecting a starting point among multiple points in a parameter space, each point corresponding to a respective one of the parameter sets;
   calculating first object function values of the starting point and neighboring points adjacent to the starting point, each first object function value indicating a violation of a restriction of one or more workloads;
   selecting a better point with a lower first object function value among the first object function values;
   repeating the calculation operations for the better point and neighboring points adjacent to the better point; and
   continue the calculate, select and repeat operations until an allowable point corresponding to one of the parameter sets that does not violate any restrictions of any of the multiple workloads is identified.

17. The method of claim 16, further comprising:
   calculating second object function values of the allowable point and neighboring points adjacent to the allowable point, each second object function value indicating a ratio of the corresponding workload to its restriction;
   selecting a better allowable point with a lowest second object function value among the second object function values;
   repeating the calculation operations for the better allowable point and neighboring points adjacent to the better allowable point; and
   determining, as the suboptimal parameter set, a point with a lowest second object function value among the calculated second object function values.

18. The method of claim 16, wherein the starting point is randomly selected among the multiple points.

* * * * *